United States Patent
Date et al.

(10) Patent No.: US 11,615,680 B2
(45) Date of Patent: Mar. 28, 2023

(54) VOICE ALARM NOTIFICATION DEVICE

(71) Applicant: Johnson Controls Fire Protection LP, Boca Raton, FL (US)

(72) Inventors: Sonali Date, Pune (IN); Praveen Deshpande, Pune (IN); Prasad Kulkarni, Berkshire (GB); Faruk Meah, Surrey (GB)

(73) Assignee: JOHNSON CONTROLS FIRE PROTECTION LP, Boca Raton, FL (US)

( * ) Notice: Subject to any disclaimer, the term of this patent is extended or adjusted under 35 U.S.C. 154(b) by 0 days.

(21) Appl. No.: 17/430,179

(22) PCT Filed: Feb. 12, 2020

(86) PCT No.: PCT/EP2020/053661
§ 371 (c)(1),
(2) Date: Aug. 11, 2021

(87) PCT Pub. No.: WO2020/165290
PCT Pub. Date: Aug. 20, 2020

(65) Prior Publication Data
US 2022/0101701 A1   Mar. 31, 2022

(30) Foreign Application Priority Data

Feb. 12, 2019   (GB) .................................... 1901937

(51) Int. Cl.
*G08B 3/10*   (2006.01)
*H04W 4/80*   (2018.01)
(Continued)

(52) U.S. Cl.
CPC .............. *G08B 3/10* (2013.01); *G08B 17/00* (2013.01); *G08B 25/10* (2013.01); *H04W 4/80* (2018.02); *H04W 12/50* (2021.01)

(58) Field of Classification Search
CPC .......... G08B 3/10; G08B 17/00; G08B 25/10; G08B 7/06; H04W 4/80; H04W 12/50
See application file for complete search history.

(56) References Cited

U.S. PATENT DOCUMENTS 6,990,335 B1 *  1/2006  Shamoon ................ H04M 3/42
                                                          455/410
10,339,097 B2   7/2019  El-Mankabady et al.
(Continued)

FOREIGN PATENT DOCUMENTS

CN   101 628 675 A   1/2010
CN   107 767 596 A   3/2018
(Continued)

OTHER PUBLICATIONS

International Search Report and Written Opinion of the International Searching Authority, dated Apr. 1, 2020, from International Application No. PCT/EP2020/053661, filed on Feb. 12, 2020, 12 pages.
(Continued)

*Primary Examiner* — John A Tweel, Jr.
(74) *Attorney, Agent, or Firm* — Arentfox Schiff LLP

(57) ABSTRACT

A voice alarm notification device of a fire alarm system, comprising: a network port for receiving an alarm notification signal; an audio file library in which the audio files include audio voice message files; a speaker; a processor unit connected to the network port for processing an alarm notification signal and for selecting one of the audio files from the library to be played through the speaker; and a Bluetooth module for establishing a Bluetooth communication link to the voice alarm notification device, via which link an audio voice file can be received. The device is arranged to add the audio voice file received via the Bluetooth communication link to the library so as to be available for selection by the processor unit when it receives an alarm notification signal.

10 Claims, 3 Drawing Sheets

(51) Int. Cl.
*H04W 12/50* (2021.01)
*G08B 25/10* (2006.01)
*G08B 17/00* (2006.01)

(56) References Cited

U.S. PATENT DOCUMENTS

| | | | |
|---|---|---|---|
| 10,417,298 B2 * | 9/2019 | Scannell, Jr. | ..... H04M 3/42229 |
| 2012/0068842 A1 | 3/2012 | Piccolo, III | |
| 2015/0077240 A1 | 3/2015 | Eck | |
| 2015/0142898 A1 | 5/2015 | Piccolo, III | |

FOREIGN PATENT DOCUMENTS

| | | |
|---|---|---|
| CN | 108 140 299 A | 6/2018 |
| GB | 2471860 A | 1/2011 |

OTHER PUBLICATIONS

Combined Search and Examination Report dated Aug. 12, 2019, from British Application No. GB1901937.1, filed on Feb. 12, 2019. 6 pages.
International Preliminary Report on Patentability, dated Aug. 26, 2021, from International Application No. PCT/EP2020/053661, filed on Feb. 12, 2020. 8 pages.

* cited by examiner

VOICE ALARM NOTIFICATION DEVICE

RELATED APPLICATIONS

This application is a § 371 National Phase Application of International Application No. PCT/EP2020/053661, filed on Feb. 12, 2020, now International Publication No. WO 2020/165290 A1, published on Aug. 20, 2020, which International Application claims priority to GB Application 1901937.1, filed on Feb. 12, 2019, both of which are incorporated herein by reference in their entirety.

FIELD OF THE INVENTION

The present invention relates to a voice alarm notification device of a fire alarm system which is able to emit pre-recorded audio voice messages from a speaker, and to a related method.

BACKGROUND OF THE INVENTION

Many fire alarm systems now include an arrangement which has voice alarm notification devices which, when a fire is detected, notify the occupants of a building protected by the fire alarm system with a pre-recorded voice message. The device typically includes a number of pre-recorded voice messages which can be selected based on the situation which has arisen. For example, the voice message might instruct occupants of the building to leave the building by their nearest exit, but if it is known that the fire has been detected near one of those exits, it might instruct the occupants to leave by a specific exit that is remote from the fire. Alternatively, a building might be evacuated in stages, with those occupants who are most distant from the fire being instructed with a pre-recorded voice message to ready themselves for evacuation, but to remain where they are until occupants who are closer to the fire have been evacuated.

It has been shown that fire alarm systems which use a voice alarm notification device to instruct the occupants of a building in the event of a fire reduce the number of fatalities and injuries from the fire as well as from the evacuation process.

Unfortunately, many fire alarm systems are not able to include a voice alarm notification device because such devices are not compatible with other components of the system. For example, in one known system, the fire alarm system comprises a central control panel (often known as control and indicating equipment, CIE) and a number of addressable network loops extending from the control panel on which are located a number of fire detector units, call point units and sounder units, each of which is arranged to be able to communicate with the control panel through addressed messages. The control panel also supplies the power that the units on the loops require to operate. The transmission rate for data through the loops is typically about 500 bytes per second, although it is often less than this. Thus, the loops are typically fully utilised with routine data passing between the units and the control panel.

One of the requirements for voice alarm notification devices is that, in addition to a basic library of pre-recorded voice messages held in files, it must be possible to add more pre-recorded voice messages to the library so that a proper custom installation can be carried out for a particular building. Unfortunately, many networks, such as the one described above, just do not have sufficient data communication capacity to transmit new messages to the voice alarm notification device within a reasonable timescale. As a result, such devices are actually installed on a separate public address and voice alarm (PAVA) system. The fire alarm system has to instruct the separate PAVA system to issue voice messages, when such a system is installed. It will be appreciated, therefore, that voice alarm notification devices are not installed in fire alarm systems themselves.

US 2015/077240 A1 discloses a smoke detector comprising a logic device, a smoke sensor coupled to the logic device, a communications interface coupled to the logic device, an audio amplifier coupled to the logic device, a speaker coupled to the audio amplifier, and a power supply coupled to and powering the logic device, communications interface and audio amplifier; wherein when the smoke sensor detects smoke the logic device generates at least one smoke alarm tone through the audio amplifier and to the speaker, and a smoke alarm signal through the communications interface; wherein audio content is provided through the communications interface, the logic device, the audio amplifier and to the speaker when there is not a current smoke alarm. The power supply with battery backup may be coupled from the house alternating current (AC) power electrical branch circuit.

GB 2471860 A refers to a signal for use on a wired network interconnecting electronic devices comprising a base voltage, a pulsed voltage signal and a digital signal, and to detector apparatuses with voice data capabilities of a wired network for power conservation and backwards compatibility.

There remains a need for installing a voice alarm notification device in a fire alarm system in such a way that pre-recorded voice messages can be added, as required, without overwhelming the addressable loop and control panel.

SUMMARY OF THE INVENTION

According to a first aspect of the present invention, a voice alarm notification device of a fire alarm system, comprises: a network port for receiving an alarm notification signal; an audio file library in which audio files include audio voice message files; a speaker; a processor unit connected to the network port operable to process an alarm notification signal and to select one of the audio files from the audio library to be played through the speaker; and a Bluetooth module operable to establish a Bluetooth communication link to the voice alarm notification device, via which link an audio voice file can be received; wherein the device is arranged to add the audio voice file received via the Bluetooth communication link to the library so as to be available for selection by the processor unit when it receives the alarm notification signal. Audio files can thus be added quickly without overwhelming the network, and this makes it possible to put the voice alarm notification device on the network of a fire alarm system.

In one arrangement, the voice alarm notification device has a voice alarm notification function, and the device is arranged as part of a fire alarm system with other components. In the fire alarm system, the voice alarm notification device is a separate device, dedicated to processing alarm notification signals received through the network, which is important so as to enable it to provide a prompt and accurate response to hazards.

The presence of a first communications interface in the form of a network port and of a second communications interface in the form of a Bluetooth module, provides the advantage of enabling two communication channels/paths for exchanging different type of information, rendering the system and its response to hazards as efficient as possible, and reducing the likelihood of information overload on the network predominantly used for alarm notifications.

Preferably, the voice alarm notification device further comprises a Bluetooth module controller operable to control the Bluetooth module so as to enable and disable it from establishing the Bluetooth communication link; wherein the network port is arranged to receive a Bluetooth enable signal, and the Bluetooth module controller is arranged to enable the Bluetooth module to establish the Bluetooth communication link when the Bluetooth enable signal is received by the network port. This keeps the device secure from malicious interference until the Bluetooth module is required.

The voice alarm notification device may include a timer, and the Bluetooth module controller may be arranged to disable the Bluetooth communication link at the end of a Bluetooth communication period measured by the timer. This reduces the power consumption of the voice alarm notification device when the Bluetooth module is not required, and secures the device from malicious interference when the Bluetooth module is not in use.

The network port may be arranged to receive a Bluetooth disable signal, and the Bluetooth module controller may be arranged to disable the Bluetooth module to disable the Bluetooth communication link when the Bluetooth disable signal is received by the network port. This reduces the power consumption of the voice alarm notification device when the Bluetooth module is not required, and secures the device from malicious interference when the Bluetooth module is not in use.

In one arrangement, the voice alarm notification device further comprises a configuration memory operable to store the configuration of the voice alarm notification device, the configuration of the device including information on the audio files in the audio file library. The Bluetooth module may also be arranged to import and export at least a part of the configuration of the voice alarm notification device.

According to a second aspect of the present invention, a method of adding an audio file to a library of a networked voice alarm notification device comprises: transmitting a Bluetooth enable signal to the networked voice alarm notification device via the network; pairing a Bluetooth communication device with the networked voice alarm notification device; and transferring an audio file from the Bluetooth communication device to the networked voice alarm notification device. Audio files can thus be added quickly without overwhelming the network, and this makes it possible to put the voice alarm notification device on the network of a fire alarm system.

The method preferably further comprises the step of transferring configuration information from the Bluetooth communication device to the networked voice alarm notification device while they are paired. The method may further comprise the step of transferring configuration information from the networked voice alarm notification device to the Bluetooth communication device while they are paired.

The method may further comprise the step of un-pairing the Bluetooth communication device and the networked voice alarm notification device.

In the meaning of the present invention, Bluetooth is an internationally recognized standard of wireless communication technology, standardized as IEEE 802.15.1, and as such is mentioned or referred to above and in the following.

A preferred embodiment of the invention will now be described by way of example only, with reference to the drawings in which.

Figure 1:
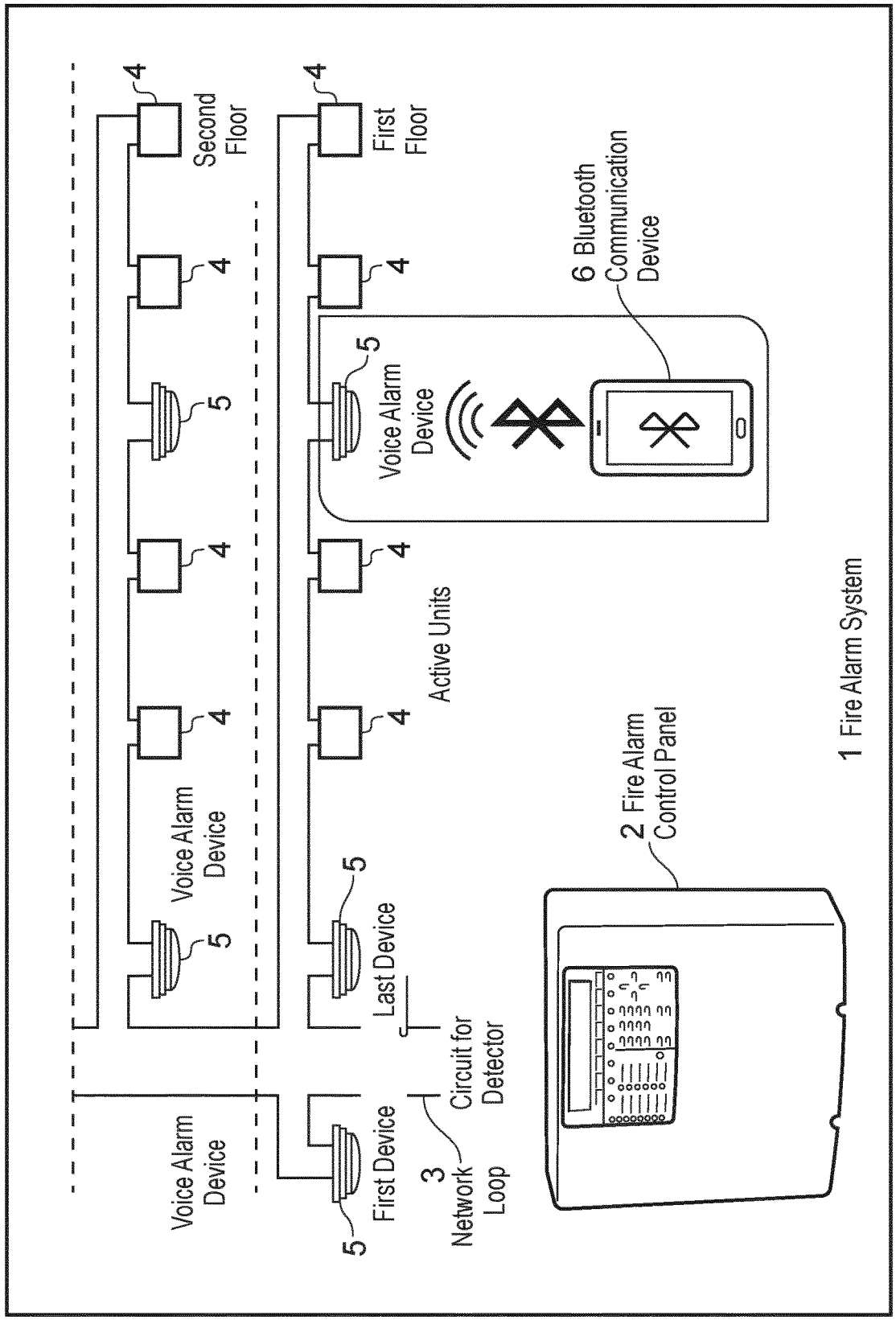
FIG. 1 is a schematic view of a fire alarm system including voice alarm notification devices according to the present invention.

Referring first to FIG. 1, a fire alarm system 1 is shown which includes a control panel 2 from which extends a network loop 3 in the form of an addressable two wire system on which is carried a number of active units 4 of the fire alarm system 1. The active units 4 might include fire detectors, call points, sounders and the like. The network loop 3 also carries a number of voice alarm notification devices 5. The control panel 2 supplies power to the active units 4 and to the voice alarm notification devices 5 through the network loop 3 so that the active units 4 and the voice alarm notification devices 5 do not have to source power independently. Additionally, communication between the control panel 2 and the active units 4 and the voice alarm notification devices 5 is carried out through addressed messages. This permits the control panel 2 to be able to communicate individually with each of the active units 4 and voice alarm notification devices 5. A significant amount of communication occurs whereby the control panel 2 ensures that it is able to identify faults in the system quickly, to initiate tests, and the like, and whereby the active units 4 which are fire detectors are able to communicate the existence of a fire condition to the control panel 2 quickly through an addressed message. As a result, the network loop 3 operates a high volume of communication, and has very limited capacity to add more communication, and more transfer of data.

FIG. 1 also shows a Bluetooth communication device 6 which has established a Bluetooth pairing with one of the voice alarm notification devices 5 so as to be able to communicate with that device 5 using the Bluetooth protocol.

Figure 2:
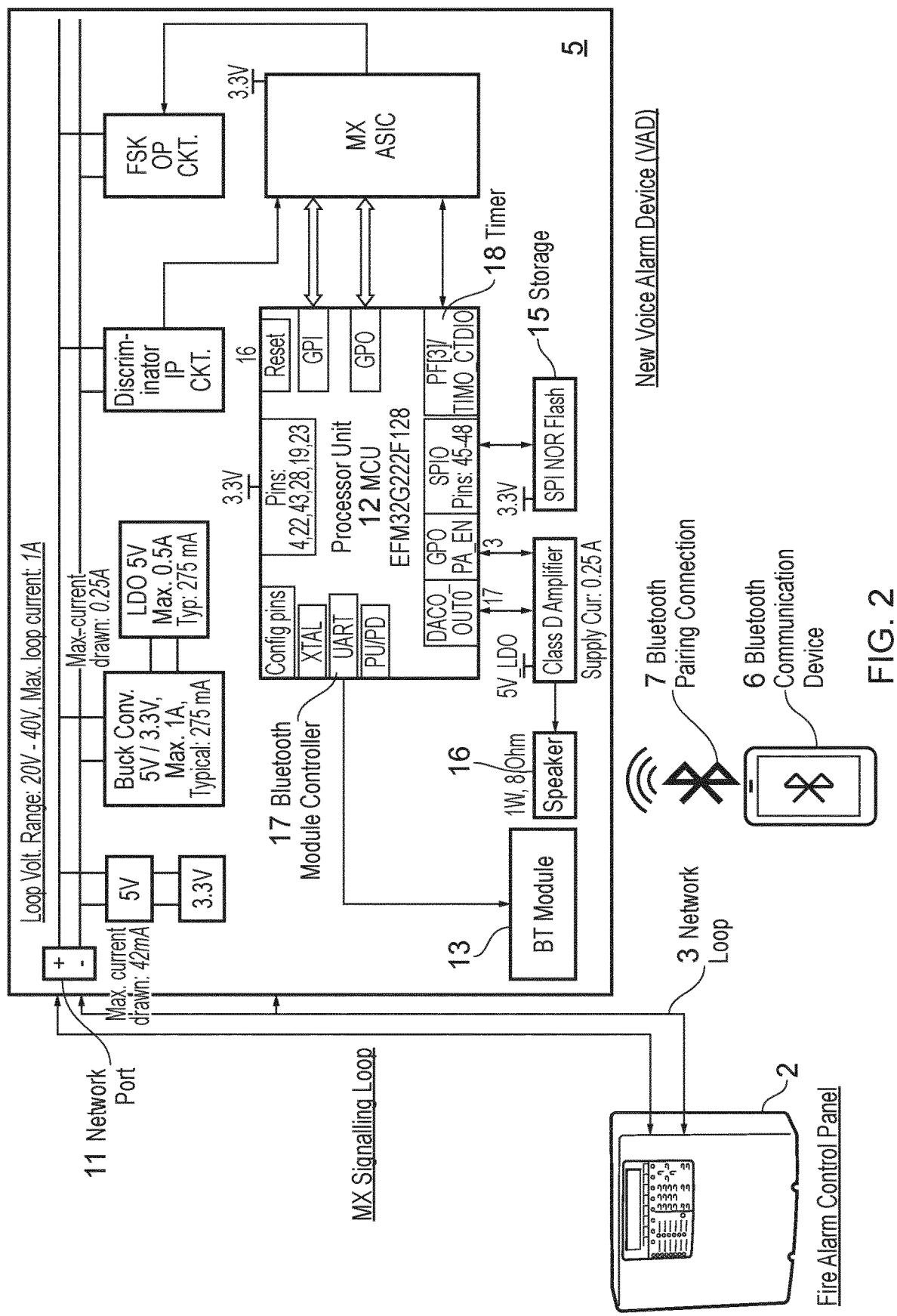
FIG. 2 is a schematic view of the voice alarm notification device of the present invention showing its connection to a fire alarm control panel and to a Bluetooth communication device.

Referring now to FIG. 2, a voice alarm notification device 5 is shown in more detail with its connections to the control panel 2 via the network loop 3 and to a Bluetooth communication device 6 via a Bluetooth pairing connection 7.

The voice alarm notification device 5 includes a network port 11 for connection to the network loop 3, a processor unit 12, a Bluetooth module 13 for establishing the Bluetooth pairing connection 7 with the Bluetooth communication device 6, storage 15 and a speaker 16. The processor unit 12 includes a Bluetooth module controller 17 and a timer 18. The Bluetooth module controller 17 controls the enablement of the Bluetooth module 13. In effect, it switches the Bluetooth module 13 on and off depending on whether the Bluetooth pairing connection 7 is required. It is undesirable to have the Bluetooth module 13 enabled all of the time because its availability to pair with a Bluetooth communication device 6 poses a security risk with the possibility of unauthorised access. Furthermore, once the Bluetooth module 13 has been enabled, it may be desirable for it to be disabled after a period of time, in case the Bluetooth module 13 is inadvertently left enabled. The timer 18 supplies a timing signal to the Bluetooth module controller 17 so that after a preset period of time, it may disable the Bluetooth module 13.

Storage 15 contains an audio file library in which a number of audio files are stored, those files including audio voice message files. An audio voice message from an audio voice message file can be played through the speaker 16 in order to provide an audio message to occupants of a building. The processor unit 12 is able to retrieve an audio file from the audio file library to transmit the audio voice message from the speaker 16.

Example:

When a fire is detected by a fire detector unit on a network loop 3 of the fire alarm system 1, it sends a fire alarm signal in the form of an addressed message to the control panel 2 via the network loop 3. The control panel 2 assesses the message, and takes action depending on the location and other information about the detected fire. In this instance, the control panel 2 sends messages to sounder units on the network loop 3 instructing them to sound an alarm. The sounder units will sound the alarm by emitting a loud audible tone. The control panel 2 also sends a message to a voice alarm notification device 5 instructing it to emit an audio voice message instructing the occupants of the building in the region of the voice alarm notification device to evacuate the building. This addressed message is sent through the network loop 3 and is received by the network port 11 where it is conveyed to the processor unit 12. The processor unit 12 identifies the audio voice file corresponding to the evacuation message and instructs the retrieval of that audio voice file from the audio file library of storage 15, and its emission from the speaker 16. The emission of the evacuation message ensures that the occupants of the building in the region of the voice alarm notification device know that they must evacuate the building immediately.

The network port 11 can be considered as a first communications interface by which addressed messages from the control panel are received by the voice alarm notification device from the network loop 3.

The Bluetooth module 13 can be considered as a second communications interface by which audio voice files can be received.

Figure 3:
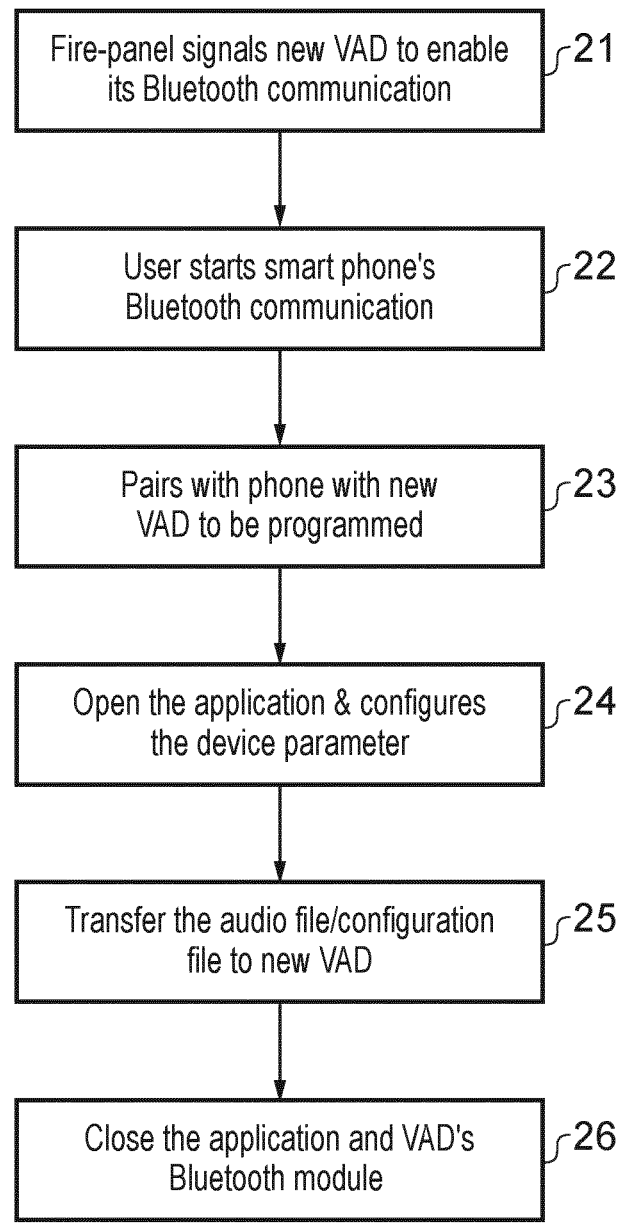
FIG. 3 is a flow diagram showing the steps taken to operate the present invention.

Example:

The audio file library contains a limited number of audio voice files because storage of all possible audio voice files would require very large storage 15, which is expensive and consumes unnecessary power. During commissioning of the fire alarm system, a voice alarm notification device is configured so that the audio file library includes all of the audio files that it requires. Subsequent configuration can also be carried out in order to adapt to changes within the building being protected, as well as to add new messages which improve the operation of the fire alarm system. Adding new audio files to the audio file library, either during commissioning or subsequently is carried out in the following way, and is illustrated in the flow diagram of FIG. 3.

The first step 21 is to enable the Bluetooth module 13 of the voice alarm notification device 5. This is done by a technician operating the control panel 2 to send a Bluetooth enable signal in a message addressed to the voice alarm notification device 5 via the network loop 3. This is received by the network port 11 which conveys the message to the Bluetooth module controller 17 of the processor unit 12. The Bluetooth module controller 17 enables the Bluetooth module 13 to make it available for pairing according to the Bluetooth protocol.

The second step 22 is that the technician moves to a position close to the voice alarm notification device 5 with a Bluetooth communication device 6. Conveniently, this will be a mobile phone, but could be some other device which is Bluetooth enabled. The technician starts the Bluetooth communication device's Bluetooth communication.

The third step 23 is for the technician to pair the Bluetooth communication device 6 with the voice alarm notification device 5.

The fourth step 24 is to open an application on the Bluetooth communication device 6 and to configure the device parameter. The application permits the technician to configure parameters such as audio messages, volume levels, device label, device address.

The fifth step 25 is to transfer an audio file from the Bluetooth communication device 6 to the voice alarm notification device 5 through the Bluetooth pairing connection 7. The processor unit 12 directs the audio file into the audio file library in storage 15 for later use. The Bluetooth communication device 6 might also transfer a configuration file relating to the audio file to the voice alarm notification device.

The audio file transferred by the communication device 6 might be one which is already stored as a file on the Bluetooth communication device 6, or it might be one which is created by the communication device by the technician speaking directly into the communication device. Either way, an audio voice message file is created which ends up being stored in the audio file library.

The sixth step 26 is for the technician to close the application and to send a Bluetooth disable signal from the control panel 2 to the voice alarm notification device 5 so that the Bluetooth module controller 17 can disable the Bluetooth module thereby ending its ability to pair with other devices.

It is possible that the technician might forget to disable the Bluetooth module. In that event, the Bluetooth module is disabled after a predefined period of time because, when it is initially enabled, the timer 18 is activated such that, after the predefined period of time, the Bluetooth module controller 17 disables the Bluetooth module 13.

The skilled person will realise that steps of various above-described methods can be performed by programmed computers. Accordingly the above-mentioned embodiments should be understood to cover storage devices containing machine-executable or computer-executable instructions to perform some or all of the steps of the above-described methods. The embodiments are also intended to cover computers programmed to perform the steps of the above-described methods.

The functionality of the elements shown in the Figures can be provided using either dedicated hardware and/or software. The expressions "processing", "processing means" and "processing module" can include, but is not limited to, any of digital signal processor (DSPs) hardware, network processors, application specific integrated circuits (ASICs), field programmable gate arrays (FPGAs). Similar, "memory" can include, but is not limited to, read only memories (ROMs) for storing software, random access memories (RAMs), and non-volatile storage.

Features of the present invention are defined in the appended claims. While particular combinations of features have been presented in the claims, it will be appreciated that other combinations, such as those provided above, may be used.

The invention claimed is:

1. A voice alarm notification device of a fire alarm system, comprising:
   a network port for receiving an alarm notification signal;
   an audio file library in which audio files include audio voice message files;

a speaker;

a processor unit connected to the network port operable to process an alarm notification signal and to select one of the audio files from the audio library to be played through the speaker; and a Bluetooth module operable to establish a Bluetooth communication link to the voice alarm notification device, via which link an audio voice file can be received;

wherein the device is arranged to add the audio voice file received via the Bluetooth communication link to the library so as to be available for selection by the processor unit when it receives the alarm notification signal.

2. The voice alarm notification device according to claim 1, further comprising a Bluetooth module controller operable to control the Bluetooth module so as to enable and disable it from establishing the Bluetooth communication link;

wherein the network port is arranged to receive a Bluetooth enable signal, and the Bluetooth module controller is arranged to enable the Bluetooth module to establish the Bluetooth communication link when the Bluetooth enable signal is received by the network port.

3. The voice alarm notification device according to claim 2, further comprising a timer, and wherein the Bluetooth module controller is arranged to disable the Bluetooth communication link at the end of a Bluetooth communication period measured by the timer.

4. The voice alarm notification device according to claim 2, wherein the network port is arranged to receive a Bluetooth disable signal, and the Bluetooth module controller is arranged to disable the Bluetooth module to disable the Bluetooth communication link when the Bluetooth disable signal is received by the network port.

5. The voice alarm notification device according to claim 1, further comprising a configuration memory operable to store a configuration of the voice alarm notification device, the configuration of the device including information on the audio files in the audio file library.

6. The voice alarm notification device according to claim 5, wherein the Bluetooth module is arranged to import and export at least a part of the configuration of the voice alarm notification device.

7. A method of adding an audio file to a library of a networked voice alarm notification device of a fire alarm system comprising:

transmitting a Bluetooth enable signal to the networked voice alarm notification device via the network;

pairing a Bluetooth communication device with the networked voice alarm notification device; and transferring the audio file from the Bluetooth communication device to the networked voice alarm notification device.

8. The method according to claim 7, further comprising the step of transferring configuration information from the Bluetooth communication device to the networked voice alarm notification device while they are paired.

9. The method according to claim 7, further comprising the step of transferring configuration information from the networked voice alarm notification device to the Bluetooth communication device while they are paired.

10. The method according to claim 7, further comprising un-pairing the Bluetooth communication device and the networked voice alarm notification device.

* * * * *